US012756654B2

(12) United States Patent
Park et al.

(10) Patent No.: US 12,756,654 B2
(45) Date of Patent: Oct. 6, 2026

(54) METHODS AND APPARATUS FOR CONFIGURING A ROUTE SELECTION POLICY

(71) Applicant: Samsung Electronics Co., Ltd., Suwon-si (KR)

(72) Inventors: Jungshin Park, Suwon-si (KR); Mehrdad Shariat, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 423 days.

(21) Appl. No.: 18/191,235

(22) Filed: Mar. 28, 2023

(65) Prior Publication Data

US 2023/0353481 A1 Nov. 2, 2023

(30) Foreign Application Priority Data

Mar. 29, 2022 (GB) ...................................... 2204456
Mar. 9, 2023 (GB) ...................................... 2303484

(51) Int. Cl.
*H04L 45/02* (2022.01)
*H04W 40/02* (2009.01)

(52) U.S. Cl.
CPC ............. *H04L 45/08* (2013.01); *H04W 40/02* (2013.01)

(58) Field of Classification Search
CPC ............................... H04L 45/08; H04W 40/02
See application file for complete search history.

(56) References Cited

U.S. PATENT DOCUMENTS

2020/0053622 A1* 2/2020 Huang-Fu ......... H04W 28/0268
2020/0187085 A1* 6/2020 Jagannatha ......... H04L 41/5041
2020/0412559 A1 12/2020 Tang
2021/0037380 A1 2/2021 Lee et al.
2021/0410059 A1* 12/2021 Talebi Fard .......... H04W 40/02
2023/0117382 A1* 4/2023 Zhang ..................... H04W 8/00 709/224
2023/0319679 A1* 10/2023 Sung ..................... H04W 40/12 370/329

(Continued)

FOREIGN PATENT DOCUMENTS

EP 4 492 868 A1 1/2025
WO 2021/243598 A1 12/2021
WO 2021/259481 A1 12/2021

OTHER PUBLICATIONS

China Telecom, Discussion on NWDAF assisted URSP, 23GPP TSG-SA2 # 147E (e-meeting), S2-2107213, Oct. 18-Oct. 22, 2021.

(Continued)

*Primary Examiner* — Ricky Q Ngo
(74) *Attorney, Agent, or Firm* — Jefferson IP Law, LLP

(57) ABSTRACT

The disclosure relates to a 5G or 6G communication system for supporting a higher data transmission rate. A method of a first network entity in a communication network is provided. The method includes requesting, to a second network entity of a network data analytics function (NWDAF), at least one analytic for updating control information including at least one component; receiving, from the second network entity, information on the at least one analytic; and configuring the control information based on the at least one component and the received information on the at least one analytic, wherein the at least one component is mapping to the at least one analytic.

16 Claims, 2 Drawing Sheets

(56) References Cited

U.S. PATENT DOCUMENTS

2025/0023816 A1* 1/2025 Lv ........................ H04W 76/10

OTHER PUBLICATIONS

China Telecom et al., FS_eNA_ph3 KI for WT#3.7: NWDAF-assisted Ursp, 3GPP TSG-WG SA2 Meeting #149E e-meeting, S2-2200801, Feb. 14-25, 2022.
3rd Generation Partnership Project; Technical Specification Group Services and System Aspects; Study of Enablers for Network Automation for 5G System (5GS); Phase 3 (Release 18), 3GPP TR 23.700-81 V0.1.0 (Mar. 2022).
Etri et al., Update on NWDAF-assisted URSP, 3GPP TSG-SA2 Meeting #155, S2-2303541, Feb. 20-Feb. 24, 2023.
Ericsson et al., Kl#6, Evaluation and conclusions for NWDAF-assisted URSPs, 3GPP TSG-WG SA2 Meeting #152E e-meeting, S2-2207160, Aug. 17-26, 2022.
Extended European Search Report dated May 8, 2025, issued in European Application No. 23781320.9.
3GPP; 5G; Architecture enhancements for 5G System (5GS) to support network data analytics services (3GPP TS 23.288 version 17.4.0 Release 17); ETSI TS 123 288; V17.4.0; May 2022; Sophia Antipolis Cedex, France.
3GPP; 3rd Generation Partnership Project; Technical Specification Group Services and System Aspects; Policy and charging control framework for the 5G System (5GS); Stage 2 (Release 17); 3GPP TS 23.503; V17.4.0; Mar. 2022; Valbonne, France.
3GPP; 3rd Generation Partnership Project; Technical Specification Group Services and System Aspects; System architecture for the 5G System (5GS); Stage 2 (Release 17); 3GPP TS 23.501; V17.4.0; Mar. 2022; Valbonne, France.
3GPP; 3rd Generation Partnership Project; Technical Specification Group Services and System Aspects; Procedures for the 5G System (5GS); Stage 2 (Release 17); 3GPP TS 23.502; V17.4.0 ; Mar. 2022; Sophia Antipolis, France.
UK Examination Report dated Mar. 12, 2025, issued in Application No. GB2303484.6.
Huawei, HiSilicon, S2-2006908, Miscellaneous corrections for TR 23.700-91, 3GPP TSG SA2 Meeting #141E e-meeting, Elbonia, Oct. 12-Oct. 23, 2020.
Interdigital, S2-2007292,KI8, Evaluation of Solutions and Conclusions, SA WG2 Meeting #141E, Oct. 12-23, 2020.
Huawei, HiSilicon, S2-185443, Analytic Informationa Exposure to PCF for URSP Optimization, SA WG2 Meeting #127-Bis, May 28-Jun. 1, 2018.
United Kingdom Intellectual Property Office Search Report dated Sep. 22, 2023, issued in United Kingdom Application No. GB2303484.6.
International Search Report with Written Opinion dated Jun. 27, 2023; International Appln. No. PCT/KR2023/004135.
British Examination Report dated Jul. 9, 2025, issued in British Patent Application No. GB2303484.6.

* cited by examiner

METHODS AND APPARATUS FOR CONFIGURING A ROUTE SELECTION POLICY

CROSS-REFERENCE TO RELATED APPLICATION(S)

This application is based on and claims priority under 35 U.S.C. § 119(a) of a United Kingdom patent application number 2204456.4, filed on Mar. 29, 2022, in the United Kingdom Intellectual Property Office, and of a United Kingdom patent application number 2303484.6, filed on Mar. 9, 2023, in the United Kingdom Intellectual Property Office, the disclosure of each of which is incorporated by reference herein in its entirety.

BACKGROUND

1. Field

The disclosure relates to a wireless communication technology. More particularly, the disclosure relates to configuring a route selection policy (URSP).

2. Description of Related Art 5G mobile communication technologies define broad frequency bands such that high transmission rates and new services are possible, and can be implemented not only in "Sub 6 GHz" bands such as 3.5 GHZ, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Herein, the following documents are referenced:

3GPP TS 23.288 (V17.4.0)
3GPP TS 23.503 (V17.4.0)
3GPP TS 23.501 (V17.4.0)
3GPP TS 23.502 (V17.4.0)

There is an increasing desire to improve network automation for 5th generation (5G) telecommunication networks, known as enabling Network Automation (eNA). As a part of this, Network Data Analytics Function (NWDAF) as defined in 3rd generation partnership project (3GPP)

Technical Specification, TS, 23.288 (for example, referring to version 17.4.0) is defined as part of a Service Based Architecture (SBA) using mechanisms and interfaces specified for 5G Core and Operations Administration and Maintenance (OAM).

In an SBA, each 5G Core (5GC) network function (NF) comprises a set of services that interfaces it (as the producer of such services) to other NFs (as the consumer of those services) over a common bus known as service-based interface (SBI).

NWDAF is a 5GC NF that provides different sets of output analytics and predictions based on input data that it collects from other 5GC NFs, Application Function (AF) or OAM.

NWDAF can currently provide different network analytics to the PCF for policy decisions as described in clause 6.1.1.3 of 3GPP TS 23.503 (for example, referring to version 17.4.0).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods, apparatus and/or systems for configuring a route selection policy (URSP).

Another aspect of the disclosure is to provide methods, apparatus and systems for configuring control information relating to traffic routing at a user equipment (UE), based on analytic information from a network data analytics function (NWDAF).

Another aspect of the disclosure is to provide methods, apparatus and systems for configuring URSP rules for a UE based on subscription to analytic information from a NWDAF, in 3rd generation partnership project (3GPP) 5th generation (5G) new radio (NR).

In accordance with an aspect of the disclosure, a method for configuring a route selection policy of a first network entity of a policy control function (PCF) in a communication network is provided. The method comprises: requesting, to a second network entity of a network data analytics function (NWDAF), at least one analytic for updating control information including at least one component; receiving, from the second network entity, information on the at least one analytic; and configuring the control information based on the at least one component and the received information on the at least one analytic, wherein the at least one component is mapping to the at least one analytic.

In accordance with an aspect of the disclosure, the information on the at least one analytic comprises information on the mapped at least one analytic to the one of the at least one component, and configuring the control information comprises updating the route selection policy based on the information on the mapped at least one analytic to the one of the at least one component.

In accordance with an aspect of the disclosure, the at least one component includes at least one of: network slice selection, data network name (DNN) selection, non-seamless offload indication, protocol data unit (PDU) session pair identifier (ID), PDU session type, access type preference, session and service continuity (SSC) mode selection, or redundancy sequence number (RSN).

In accordance with an aspect of the disclosure, the mapped at least one analytic comprises slice load level, service experience or data dispersion, in case that the at least one component includes network slice selection, the mapped at least one analytic comprises service experience, user equipment (UE) communication, redundant transmission experience or data network (DN) performance, in case that the at least one component includes DNN selection, the mapped at least one analytic comprises network performance or user data congestion, in case that the at least one component includes non-seamless offload indication, or the mapped at least one analytic comprises redundant transmission experience, in case that the at least one component includes PDU session pair ID.

In accordance with an aspect of the disclosure, the method further comprises configuring the control information to include at least one criterion, wherein the at least one criterion is associated with the at least one of analytic.

In accordance with an aspect of the disclosure, the at least one criterion includes a time window and/or a location criterion, the at least one analytic associated with the time window includes at least one of service experience, network performance, user data congestion, UE communication, data dispersion, redundant transmission experience, or DN performance, and the at least one analytic associated with the location criterion includes at least one of service experience, network performance, user data congestion, UE communication, data dispersion, redundant transmission experience, or DN performance.

In accordance with an aspect of the disclosure, the method further comprises initiating delivery of the control information to a user equipment (UE) in the communication network, requesting the at least one analytic comprises requesting the at least one analytic via a third network entity performing an application function (AF) in communication with the UE.

In accordance with an aspect of the disclosure, the control information is one of a UE route selection policy (USRP), or USRP rule for the UE. In accordance with an aspect of the disclosure, requesting the at least one analytic comprises subscribing to the at least one analytic with the second network entity, and transmitting a request comprising an analytics ID for each of the at least one analytic.

Additional aspects will be set forth in part in the description which follows and, in part, will be apparent from the description, or may be learned by practice of the presented embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
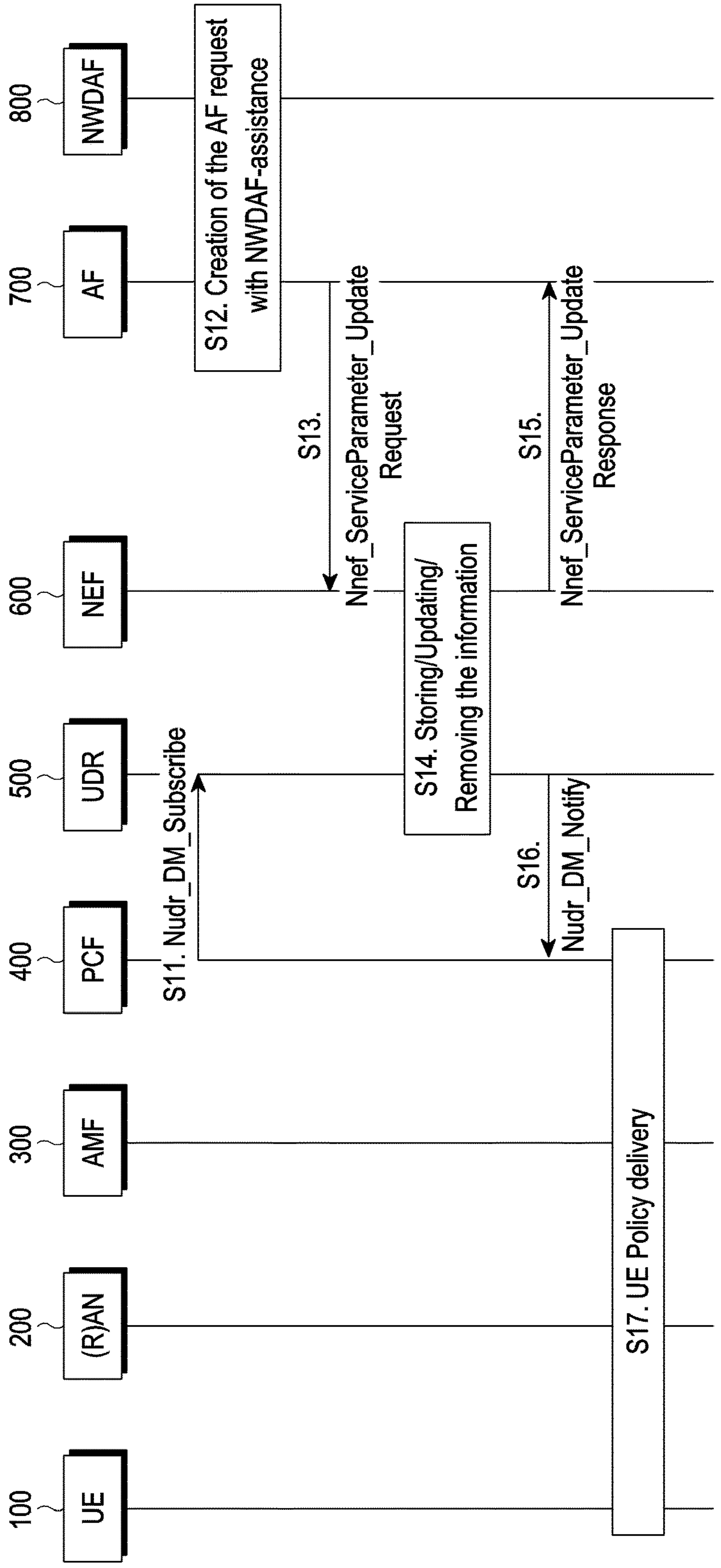
FIG. 1 is a representation of a call flow according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout this document, the words "comprise", "contain" and "include", and variations thereof, for example "comprising", "containing" and "including", means "including but not limited to", and is not intended to (and does not) exclude other features, elements, components, integers, steps, processes, functions, characteristics, and the like.

Throughout this document, language in the general form of "X for Y" (where Y is some action, process, function, activity or step and X is some means for carrying out that action, process, function, activity or step) encompasses means X adapted, configured or arranged specifically, but not necessarily exclusively, to do Y.

Features, elements, components, integers, steps, processes, functions, characteristics, and the like, described in conjunction with a particular aspect, embodiment, example or claim are to be understood to be applicable to any other aspect, embodiment, example or claim disclosed herein unless incompatible therewith.

Certain examples of the disclosure provide methods, apparatus and/or systems for resource scheduling in a multi-hop network. The following examples are applicable to, and use terminology associated with, 3GPP 5G. However, the skilled person will appreciate that the techniques disclosed herein are not limited to these examples or to 3GPP 5G, and may be applied in any suitable system or standard, for example one or more existing and/or future generation wireless communication systems or standards. The skilled person will appreciate that the techniques disclosed herein may be applied in any existing or future releases of 3GPP 5G NR or any other relevant standard. For example, the functionality of the various network entities and other features disclosed herein may be applied to corresponding or equivalent entities or features in other communication systems or standards. Corresponding or equivalent entities or features may be regarded as entities or features that perform the same or similar role, function, operation or purpose within the network.

The skilled person will appreciate that the disclosure is not limited to the specific examples disclosed herein. For example:

The techniques disclosed herein are not limited to 3GPP 5G.

One or more entities in the examples disclosed herein may be replaced with one or more alternative entities performing equivalent or corresponding functions, processes or operations.

One or more of the messages in the examples disclosed herein may be replaced with one or more alternative messages, signals or other type of information carriers that communicate equivalent or corresponding information.

One or more further elements, entities and/or messages may be added to the examples disclosed herein.

One or more non-essential elements, entities and/or messages may be omitted in certain examples.

The functions, processes or operations of a particular entity in one example may be divided between two or more separate entities in an alternative example.

The functions, processes or operations of two or more separate entities in one example may be performed by a single entity in an alternative example.

Information carried by a particular message in one example may be carried by two or more separate messages in an alternative example.

Information carried by two or more separate messages in one example may be carried by a single message in an alternative example.

The order in which operations are performed may be modified, if possible, in alternative examples.

The transmission of information between network entities is not limited to the specific form, type and/or order of messages described in relation to the examples disclosed herein.

Certain examples of the disclosure may be provided in the form of an apparatus/device/network entity configured to perform one or more defined network functions and/or a method therefor. Such an apparatus/device/network entity may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). Certain examples of the disclosure may be provided in the form of a system (e.g., a network) comprising one or more such apparatuses/devices/network entities, and/or a method therefor.

It will be appreciated that examples of the disclosure may be realized in the form of hardware, software or a combination of hardware and software. Certain examples of the disclosure may provide a computer program comprising instructions or code which, when executed, implement a method, system and/or apparatus in accordance with any aspect, claim, example and/or embodiment disclosed herein. Certain embodiments of the disclosure provide a machine-readable storage storing such a program.

The procedures depicted below use one or more of various network functions/entities, whose functions and definitions are known in the state of the art in at least 3GPP TS 23.501 (for example, referring to version 17.4.0) and 3GPP TS 23.502 (for example, referring to version 17.4.0):

Application Function: AF,
Network Exposure Function: NEF,
Network Data Analytics Function: NWDAF,
Unified Data Repository: UDR,
Policy Control Function: PCF,
Session Management Function: SMF,
User Plane Function: UPF,
Access and Mobility management Function: AMF,
(Radio) Access Network: (R) AN,
User Equipment: UE.

A route selection policy (URSP) as defined by TS 23.503 is used by a UE to determine how to route outgoing traffic. For example, traffic can be routed to an established protocol data unit (PDU) Session, can be offloaded to non-3GPP access outside a PDU Session, can be routed via a ProSe Layer-3 UE-to-Network Relay outside a PDU session, or can trigger the establishment of a new PDU Session.

A URSP rule includes rule precedence, Traffic descriptor, optionally Application descriptor, optionally Internet Protocol (IP) descriptor and domain descriptor relevant to the destination address (or non-IP descriptor), optionally data network name (DNN), optionally connection capabilities and list of route selection descriptors.

A route selection descriptor as part of URSP rule specifies the matching criteria and one or more of the following components:

SSC Mode Selection Policy (SSCMSP),
Network Slice Selection Policy (NSSP),
DNN Selection Policy,
PDU Session Type Policy,
Non-Seamless Offload Policy,
Access Type preference (3GPP or non-3GPP or Multi-Access),
ProSe Layer-3 UE-to-Network Relay Offload Policy,
PDU Session Pair Identity/Identifier (ID),
Redundancy Sequence Number (RSN).

Also, a route selection descriptor may include Route Selection Validation Criteria, i.e., Time Window and/or Location Criteria.

As an example, a URSP rule may include one Traffic descriptor that specifies the matching criteria and one or more of the above-mentioned components.

A URSP may be pre-configured in the UE or may be provisioned to the UE from a PCF. The pre-configured policy may be applied by the UE when it has not received the same type of policy from a PCF.

Currently, there is an issue of it not being clear whether and how the analytics provided by the NWDAF can be used to assist in the generation of Route Selection Policy (URSP) Rules from PCF. For example:

whether any and which components of the URSP rules can benefit from analytics;
whether and how existing Analytics IDs, or new Analytics ID(s) can be used to assist in the generation of URSP Rules;
what procedures trigger the subscription to these Analytics IDs;
whether new (set of) interactions(s) are required to assist in the generation of URSP Rules, and how to define the new interactions if needed; and/or
what information should be collected (or provided) as input (or output) by the NWDAF for these Analytics IDs.

Certain embodiments of the disclosure are provided to address this issue. In particular, certain embodiments of the disclosure include enhanced procedures and signaling on how NWDAF can assist in the generation of URSP rules from the PCF. Accordingly, certain embodiments of the disclosure provide assistance for traffic routing.

FIG. 1 shows a representation of a call flow according to an embodiment of the disclosure.

The call flow shown in FIG. 1 provides a novel enhancement to an existing procedure for 5G systems as defined in TS 23.502 to allow an AF 700 (or PCF 400 itself) to subscribe to NWDAF 800 analytics IDs in order to provide assistance or guidance for URSP determination. According to certain embodiments, the AF 700 can be a trusted AF belonging to the operator, while in other embodiments the AF 700 can be untrusted AF outside the trusted data network, i.e., as an external party.

In operation S11, the PCF 400 may perform a subscription for notification regarding data modification in the UDR 500. It will be appreciated that this operation may be omitted, or may occur separately to the remainder of the operations shown in FIG. 1 such that it does not need to be considered part of the embodiment. For instance, operation S11 may be omitted in a case where the PCF 400 subscribes to the NWDAF 800 directly, as will be discussed below.

The AF 700 with NWDAF 800 assistance (or the NWDAF 800 directly) may provide at least one of the below information for assistance or guidance for URSP determination by the PCF 400:

1) Service Description indicates an AF Identifier. This can be also determined based on input analytics filters or output statistics provided by the NWDAF 800.
2) Service Parameters:
   An application traffic descriptor, whose definition corresponds to that of the URSP Traffic Descriptors.
   one or more sets of Route selection parameters, each parameter may correspond to:
   (DNN, S-NSSAI). This may be provided by the AF 700/NEF 600 or can also be determined based on input analytics filters or output statistics provided by the NWDAF 800.
   a default Route selection precedence value to be used for the application traffic when Route selection precedence with a corresponding spatial validity condition is not provided.
   Route selection precedence with a corresponding spatial validity condition that indicates where the Route selection parameters apply. This may correspond to a geographical area (e.g., a civic address or shapes). This can be determined based on input analytics filters or output statistics provided by the NWDAF 800.
3) a specific UE, or a group of UE(s) or any UE that the AF request may be associated with. This can be determined based on input analytics filters or output statistics provided by the NWDAF 800.
4) Subscription to events.

The AF 700/NEF 600 or NWDAF 800 may subscribe to notifications about the outcome of the UE Policies delivery due to application guidance for URSP determination.

According to certain embodiments, when an interaction is expected between an untrusted entity outside 3GPP and a trusted entity within 3GPP domain, NEF exposure services are utilized.

According to certain embodiments, if the request is via NEF 600, the AF request may use an (external) AF service Identifier as Traffic Description, and then NEF 600 translates that to any combination of DNN, S-NSSAI, Application Identifier, Application ID and/or traffic filtering information.

Additionally, or alternatively, NEF 600 may also translate GPSI(s), external UE identifier(s) or external group ID(s) to SUPI(s), internal UE identifier(s) or internal group ID(s). NEF 600 may also translate (external) geographic zones to Tracking Area Identify (TAI) or other resolutions of location identifiable by 5GC.

In operation S12, to trigger a new request as assistance or guidance for URSP determination, the AF 700 may subscribe to existing analytics IDs (or new analytics IDs) from the NWDAF 800. And, route selection components may be mapping to analytics ID. Some examples for this are described in Table 1 below:

TABLE 1

| Information name | Analytics ID | Relevant Input to the NWDAF | Relevant Output from the NWDAF |
|---|---|---|---|
| Route Selection Component | | | |
| Network Slice Selection | Slice Load Level | 6.3.2A, TS 23.288 | 6.3.3A, TS 23.288 |
| | (Observed) Service Experience | 6.4.2, TS 23.288 | 6.4.3, TS 23.288 |
| | Data Dispersion | 6.10.2, TS 23.288 | 6.10.3, TS 23.288 |
| DNN selection | (Observed) Service Experience | 6.4.2, TS 23.288 | 6.4.3, TS 23.288 |
| | UE Communication | 6.7.3.2, TS 23.288 | 6.7.3.3, TS 23.288 |
| | Redundant Transmission Experience | 6.13.2, TS 23.288 | 6.13.3, TS 23.288 |
| | DN Performance | 6.14.2, TS 23.288 | 6.14.3, TS 23.288 |
| PDU Session Pair ID | Redundant Transmission Experience | 6.13.2, TS 23.288 | 6.13.2, TS 23.288 |
| Non-Seamless Offload indication or Access Type preference or ProSe Layer-3 UE-to-Network Relay Offload indication | Network Performance | 6.6.2, TS 23.288 | 6.6.3, TS 23.288 |
| | User Data Congestion | 6.8.2, TS 23.288 | 6.8.3, TS 23.288 |
| Route Selection Validation Criteria | | | |
| Time Window | (Observed) Service Experience | 6.4.2, TS 23.288 | 6.4.3, TS 23.288 |
| | Network Performance | 6.6.2, TS 23.288 | 6.6.3, TS 23.288 |
| | User Data Congestion | 6.8.2, TS 23.288 | 6.8.3, TS 23.288 |
| | UE Communication | 6.7.3.2, TS 23.288 | 6.7.3.3, TS 23.288 |
| | Data Dispersion | 6.10.2, TS 23.288 | 6.10.3, TS 23.288 |
| | Redundant Transmission Experience | 6.13.2, TS 23.288 | 6.13.3, TS 23.288 |
| | DN Performance | 6.14.2, TS 23.288 | 6.14.3, TS 23.288 |
| Location Criteria | (Observed) Service Experience | 6.4.2, TS 23.288 | 6.4.3, TS 23.288 |
| | Network Performance | 6.6.2, TS 23.288 | 6.6.3, TS 23.288 |
| | User Data Congestion | 6.8.2, TS 23.288 | 6.8.3, TS 23.288 |
| | UE Communication | 6.7.3.2, TS 23.288 | 6.7.3.3, TS 23.288 |
| | Data Dispersion | 6.10.2, TS 23.288 | 6.10.3, TS 23.288 |
| | Redundant Transmission Experience | 6.13.2, TS 23.288 | 6.13.3, TS 23.288 |
| | DN Performance | 6.14.2, TS 23.288 | 6.14.3, TS 23.288 |

Table 1: Examples on how existing analytics IDs may assist in URSP determination.

More generally, the AF 700 may interact with the NWDAF 800 in relation to one or more existing or new identifiers (e.g., analytics information) of the NWDAF 800; for example, arranging subscription to one or more analytics IDs.

In operation S13, the AF 700 sends its/a request including the information described earlier to the NEF 600 as assistance or guidance for URSP determination. The NEF 600 authorizes the AF request.

More generally, the AF 700 may transmit, to the NEF 600, a request including information on the one or more identifiers. Furthermore, the NEF 600 may authorize the AF request (it will be appreciated that this extra operation may be omitted).

In operation S14, the NEF 600 stores, updates or removes Application Data from UDR 500 based on the AF request (for example, this may be via UDM (Unified Data Management) services).

More generally, the NEF 600 interacts with the UDR 500 based on the request. For example, based on the information on the one or more identifiers or on at least one of the identifiers themselves, the NEF 600 may store, update, modify, delete, remove and/or create application data from the UDR 500. This may be implemented through the transmission of one or more signals between the NEF 600 and the UDR 500.

In operation S15, the NEF 600 responds to the AF 700 including the assigned Transaction Reference ID.

More generally, the NEF 600 transmits a response to the AF 700 based on the request received by the NEF 600 from the AF 700 and/or based on a result of the interactions with the UDR 500. For example, the response transmitted by the NEF 600 may comprise information on an assigned transaction identifier. This operation is also optional, and may be omitted.

In operation S16, the PCF(s) 400 receive(s) a Nudr_DM_Notify notification of data change from the UDR 500. This is based on an earlier subscription to be notified on the data modified in the UDR 500. For example, the earlier subscription may be that relating to, i.e., arranged through, operation S11.

More generally, a PCF 400 (or a plurality of PCFs 400, if the method is concerned with more than one) may receive information regarding a data change from the UDR 500. The information may include a notification that data has been modified or changed in the UDR 500, where the PCF 400 may have subscribed to be informed about a change in said data in a subscription process.

In operation S17, the PCF(s) 400 initiate(s) or update(s) UE Policy delivery via AMF 300.

For example, based on the information received from the UDR 500 in operation S16, the PCF 400 may initiate or update UE policy delivery via AMF 300. The PCF 400 may update one or more URSP rules, for example. It will be appreciated how the AMF 300 may then communicate with UE 100 via (R) AN 200 to provide the policy (e.g., the URSP) to the UE 100.

In certain embodiments, the PCF 400 may directly subscribe to the NWDAF 800 at operation S12 to get or obtain corresponding network data analytics as described above without any AF 700 event triggers (for example, operation S12 is modified such that the PCF 400 subscribes to existing or new analytics IDs from the NWDAF 800, instead of the AF 700 subscribing to the NWDAF 800). If so, the rest of the operations up to S17 (operations S13 to S16) can be skipped and the PCF 400 may initiate or update UE Policy delivery based on output analytics and/or parameters that are directly received/consumed from the NWDAF 800 as described in Table 1. Furthermore, operation S11 may be omitted as the PCF 400 directly subscribes with the NWDAF 800.

FIG. 1 illustrates a method where the following components/entities are involved: UE 100, (R) AN 200, AMF 300, PCF 400, UDR 500, NEF 600, AF 700 and NWDAF 800. However, it will be appreciated from the description of the method that one or more of these components may be omitted from other methods in accordance with the disclosure. For example, in another embodiment where the PCF directly subscribes to the NWDAF (as will be discussed below), one or more of the UDR 500, NEF 600 and AF 700 may not be present or required in the process of preparing or updating URSP for the UE 100. Of course, the skilled person would appreciate if certain components would not be omitted, such as PCF 400 or NWDAF 800.

Furthermore, although UE 100, (R) AN 200, AMF 300, PCF 400, UDR 500, NEF 600, AF 700 and NWDAF 800 are shown separately, it will be appreciated that, in certain embodiments, the functionality of one or more of these entities may be combined in a single entity, Various embodiments or modifications relating to the method illustrated in FIG. 1 are now described. It will be appreciated that the disclosure covers/includes these embodiments in isolation and in any combination, as appropriate. Additionally, where reference is made to a specific service operation(s) in yet another embodiment, where said service operation including other data, it will be appreciated that the disclosure envisages cases where, more generally, an operation is performed (e.g., by the AF 700 or PCF 400) and where the other data (or an indication thereof) is included in the operation in some suitable form.

According to certain embodiments, the AF 700 (or PCF 400) may subscribe to notifications of network analytics related to "Load Level Information" using the Nnwdaf_AnalyticsSubscription_Subscribe service operation including the Analytics ID "Load level information", the Analytics Filter "S-NSSAI" and the Analytics Reporting Information set to a load level threshold value. The AF 700 (or PCF 400) is notified when the load level of the Network Slice Instance reaches the threshold. The PCF 400 may update the URSP (e.g. the slice selection policy) of the associated UEs to a network slice instance based on this notification from the NWDAF 800.

According to certain embodiments, the AF 700 (or PCF 400) may subscribe to notifications of network analytics related to "(Observed) Service Experience" using the Nnwdaf_AnalyticsSubscription_Subscribe service operation including the Analytics ID "Service Experience", the Target of Analytics Reporting "SUPI", "Internal Group Id" or "any UE", the Analytics Filter including one or more Application Identifier(s), one or more or "any" RAT Type(s) or Frequency value(s) and the Analytics Reporting Information set to service experience threshold value(s) for the RAT Type(s) and/or Frequency value(s). The AF 700 (or PCF 400) is notified on the Service Experience statistics or predictions including, for each Application Identifier, the list of SUPIs for which Service Experience is provided and the list of RAT Types and/or Frequency values for which the Service Experience applies. In addition, both spatial and time validity may be provided as well as the confidence of the prediction. In addition, the DNN, S-NSAAI and DNAI may be provided as well. The PCF 400 may update the URSP (e.g. the slice selection policy, DNN selection policy, Validation Criteria, i.e., Time Window and Location Criteria) of the associated SUPIs to an application or network slice instance for which Service Experience is provided, based on this notification from the NWDAF 800.

According to certain embodiments, the AF 700 (or PCF 400) may subscribe to notifications of network analytics related to "Network Performance" using the Nnwdaf_AnalyticsSubscription_Subscribe service operation including the Analytics ID "Network Performance", the Target of Analytics Reporting "Internal Group Id" and the Analytics Filter including the Area of Interest. The AF 700 (or PCF 400) is notified on the Network Performance statistics or predictions including the Area of Interest. In addition, the confidence of the prediction may be provided. The PCF 400 may update the URSP (e.g. Non-Seamless Offload Policy, Access Type preference, ProSe Layer-3 UE-to-Network Relay Offload Policy, Validation Criteria, i.e. Time Window and Location Criteria) of the associated UEs within the area of interest based on this notification from NWDAF 800 (e.g. on gNB status and gNB resource usage information).

According to certain embodiments, the AF 700 (or PCF 400) may subscribe to notifications of network analytics related to "Abnormal behaviour" using the Nnwdaf_AnalyticsSubscription_Subscribe service operation including the Analytics ID "Abnormal behaviour", the Target of Analytics Reporting "SUPI", "Internal Group Id" or "any UE" and the Analytics Filter including the expected analytics type or the list of Exceptions IDs and per each Exception Id a possible threshold and other Analytics Filter Information if needed. The PCF 400 may update the URSP (e.g. Route Selection Validation Criteria, i.e. Time Window and Location Criteria) of the associated SUPI, group of UEs or UEs within the area of interest based on this notification from NWDAF 800 (e.g. considering changes to service area restriction).

According to certain embodiments, the AF 700 (or PCF 400) may subscribe to notifications of network analytics related to "UE Mobility" using NWDAF_AnalyticsSubscription_Subscribe service operation including the Analytics ID "UE Mobility", the Target of Analytics Reporting "SUPI", "Internal Group Id" and the Analytics Filter may include one or more "Area(s) of Interest". The AF 700 (or PCF 400) is notified on the UE Mobility statistics or predictions. The PCF may update the URSP (e.g. Route Selection Validation Criteria, i.e. Time Window and Location Criteria) of the associated SUPI, group of UEs or UEs within the area of interest based on this notification from NWDAF 800 (e.g. considering UE location or trajectory).

According to certain embodiments, the AF 700 (or PCF 400) may subscribe to notifications of network analytics related to "UE Communication" using NWDAF_Analytics-Subscription_Subscribe service operation including the Analytics ID "UE communication", the Target of Analytics Reporting "SUPI", "Internal Group Id" and the Analytics Filter may include one or more "Application Identifier(s)". The AF 700 (or PCF 400) is notified on the UE communication statistics or predictions including list of application(s) in use and corresponding characteristics, e.g. start time and duration time. In addition, the confidence of the prediction may be provided. The PCF 400 may update the URSP (e.g. the slice selection policy, DNN selection policy, Route Selection Validation Criteria, i.e. Time Window and Location Criteria) of the associated SUPI, group of UEs or UEs associated with the Application Identifier based on this notification from NWDAF 800 (e.g. considering Traffic characterization, Traffic Volume, Spatial activity or inactivity detection).

According to certain embodiments, the AF 700 (or PCF 400) may subscribe to notifications of network analytics related to "User Data Congestion" using NWDAF_AnalyticsSubscription_Subscribe service operation including the Analytics ID "User Data Congestion", the Target of Analytics Reporting containing a SUPI, indication requesting the identifiers of the applications that contribute the most to the traffic and the Analytics Filter may include Area of Interest, reporting threshold and maximum number of applications to be reported. The AF 700 (or PCF 400) is notified when the congestion level reaches the threshold. The notification can include the identifiers of the applications that contribute the most to the traffic. The PCF 400 may update the URSP (e.g. Non-Seamless Offload Policy, Access Type preference, ProSe Layer-3 UE-to-Network Relay Offload Policy, Validation Criteria, i.e. Time Window and Location Criteria) of the associated SUPI based on this notification from NWDAF 800 (e.g. Network Status Indication).

According to certain embodiments, the AF 700 (or PCF 400) may subscribe to notifications of network analytics related to "Data Dispersion" using NWDAF_AnalyticsSubscription_Subscribe service operation including the Analytics ID "UE Dispersion Analytics" and the dispersion analytic (DA) type, i.e. Data or Transactions. The Target of Analytics Reporting containing "SUPI", "Internal Group Id" or "any UE", and the Analytics Filter may include a list of TA(s) or an Area of Interest, or a list of Cells, or an S-NSSAI or top heavy users. With the Data Volume Dispersion Analytics type, the PCF 400 may calculate the average data rate in the network slice by subscribing to notifications of network analytics related to Data Volume Dispersion in the network slice for a duration of interest when it sets the Target of Analytics Reporting as "any UE" and the Analytics Filter as the S-NSSAI. The PCF 400 may update the URSP (e.g. DNN Selection Policy, slice selection policy, Non-Seamless Offload Policy, Access Type preference, ProSe Layer-3 UE-to-Network Relay Offload Policy, Validation Criteria, i.e. Time Window and Location Criteria) of the associated SUPI, Group of UEs or UEs in the area of interest based on this notification from NWDAF 800.

According to certain embodiments, the AF 700 (or PCF 400) may subscribe to NF load analytics to get collective behaviour information for a set of UEs to determine a group of UEs or (set of) UE(s) that a URSP is applicable to.

According to certain embodiments, the AF 700 (or PCF 400) may subscribe to Expected UE Behavioural parameters to determine Route Selection Validation Criteria, i.e. Time Window and Location Criteria of a URSP rule (e.g. based on expected UE behaviour parameters).

According to certain embodiments, the AF 700 (or PCF 400) may subscribe to QoS Sustainability Analytics, Session Management (SM) Congestion Control Experience analytics to determine DNN Selection Policy, PDU Session Type Policy, Non-Seamless Offload Policy, Access Type preference or ProSe Layer-3 UE-to-Network Relay Offload Policy and Route Selection Validation Criteria, i.e. Time Window and Location Criteria of a URSP rule.

According to certain embodiments, the AF 700 (or PCF 400) may subscribe to Redundant Transmission Experience related analytics, DN Performance Analytics to determine DNN selection, PDU Session Pair ID and Route Selection Validation Criteria, i.e. Time Window and Location Criteria of a URSP rule (e.g. based on expected UE behaviour parameters).

According to certain embodiments, the AF 700 (or PCF 400) may subscribe to a new analytics ID to get a combination of output data related to existing analytics IDs as above to determine the URSP that is applicable to a UE or group of UEs or set of UEs.

According to certain embodiments of the disclosure, the PCF 400 may, upon AM or SM Policy association establishment or modification request from the AMF 300 or SMF, or based on notifications received from UDR 500 or CHF on UE subscription change, decide that network analytics related to "Abnormal behaviour", "UE Mobility" or "UE Communication" of the UE 100 is needed for URSP and therefore subscribe to notifications of network analytics related to "Abnormal behaviour", "UE Mobility" or "UE Communication" of the UE from the NWDAF 800.

According to certain embodiments of the disclosure, the PCF 400 may use the network analytics related to "Network Performance" as input to calculate the background data transfer URSP that are negotiated with the ASP.

Figure 2:
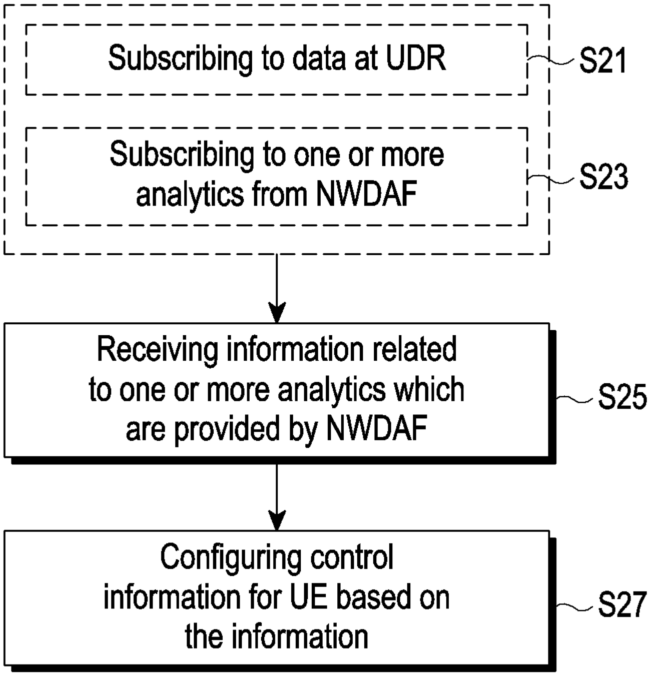
FIG. 2 is a flow diagram of a method according to an embodiment of the disclosure.

According to certain embodiments, based on the "User Data Congestion" statistics or predictions including the list of applications contributing the most to the traffic, the PCF 400 may perform URSP update in addition to SM policy modifications in the SMF for the PDU sessions handling traffic from those applications FIG. 2 illustrates a method according to an embodiment of the disclosure. The method is performed by a PCF 400.

In operation S21, the PCF 400 subscribes to data at the UDR 500, to be notified on the data. That is, the PCF 400 requests subscription to the data to be informed on a change or modification to the data. This operation is shown with a dashed border in FIG. 2, indicating that it may be omitted, i.e., it is optional. For instance, the skilled person would appreciate that the subscription may have occurred earlier, and is not essential to the embodiment. Furthermore, if the PCF 400 subscribes to the NWDAF 800 as in operation S23, the PCF 400 may not subscribe to data at the UDR 500.

In operation S23, the PCF 400 subscribes to one or more analytics (for example, an existing analytics ID such as one of those indicated in Table 1, or a new analytics ID) from the NWDAF 800. This operation is optional as shown by the dashed border, with an alternative being for an AF 700 to subscribe to one or more analytics IDs as discussed above with respect to operation S12 in FIG. 1 (in which case, operation S21 may have been performed). Accordingly, the skilled person would appreciate that this operation may be omitted for a more-general embodiment of the disclosure, in which one or more analytics of the NWDAF have been subscribed to by another entity (such as, but not limited to, the PCF 400 or the AF 700).

Both operation S21 and operation S23 are included within a dashed outline, indicating that both operations may be omitted from the description of the embodiment. That is, the skilled person would understand that these features are not essential when considering a more-general embodiment of the disclosure.

In operation S25, the PCF 400 receives information related to at least one of the one or more analytics. For example, if operation S23 is performed, the information is received from the NWDAF based on the PCF 400 subscribing to the one or more analytics IDs directly with the NWDAF. In another example, if operation S21 is performed, then operation S25 may follow from other entities (e.g., an AF 700, a NEF 600 and the UDR 500) having performed operations along the lines of operations S12-S16 of FIG. 1, in which case the information includes information on a change in the data (at the UDR 500) to which the PCF 400 is subscribed.

In operation S27, the PCF 400 configures (e.g., initiates, generates, updates, modifies) a URSP for a UE 100 based on the information. As a further, optional operation in the embodiments, the PCF 400 may transmit the URSP to an AMF 300 for delivery to the UE 100 (via an access network). That is, the UE initiates or updates UE policy delivery via the AMF 300.

Figure 3:
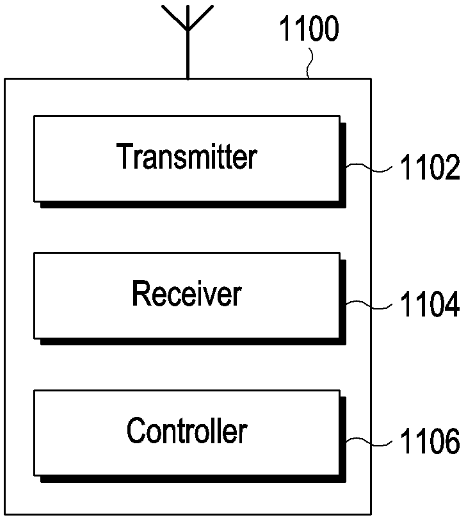
FIG. 3 is a block illustrating an example structure of a network entity according to an embodiment of the disclosure.

FIG. 3 is a block diagram illustrating a network entity (or electronic device, or network node etc.) that may be used according to an embodiment of the disclosure.

For example, a UE 100, a (R) AN 200, an AMF 300, a PCF 400, a UDR 500, a NEF 600, an AF 700 or an NWDAF 800, as described in any of the examples presented in this disclosure, may comprise or be implemented by a network entity 1100 (or in combination with network entity 1100) such as illustrated in FIG. 3. The network entity 1100 comprises a controller 1106 (or at least one processor) and at least one of a transmitter 1102, a receiver 1104, or a transceiver (not shown).

For example, referring to FIG. 1 for illustrative purposes, in a case where PCF 400 is implemented using network entity 1100: transmitter 1102 (or a transceiver) may be used in the process of subscribing to data in the UDR 500 or directly subscribing to one or more analytics IDs with the NWDAF, and/or in the process of providing the UE policy (e.g., URSP) to the AMF 300; receiver 1104 (or a transceiver) may be used to receive notification on a change in the data at the UDR 500 or information on a subscribed analytics ID or parameter directly from the NWDAF 800; and controller 1106 may be used to configure/initiate/update UE policy.

It will also be appreciated that certain aspects, embodiments and/or examples of the disclosure provide subject matter in accordance with the following numbered paragraphs.:

Paragraph 1. A method of configuring control information for a user equipment, UE, the method comprising:
subscribing to one or more analytics corresponding to a network data analytics function, NWDAF;
receiving, by a policy control function, PCF, information related to at least one of the one or more analytics; and
configuring, by the PCF, the control information for the UE based on the received information.

Paragraph 2. The method of Paragraph 1, wherein the control information is a route selection policy, URSP, comprising one or more URSP rules.

Paragraph 3. The method of Paragraph 1 or Paragraph 2, further comprising:
transmitting, by an application function, AF, a request including information on the one or more analytics to a network exposure function, NEF; and
managing, by the NEF, data at a unified data repository, UDR, based on the request;
wherein the information related to at least one of the one or more analytics includes information on a change in the data, and the information related to at least one of the one or more analytics is transmitted by the UDR.

Paragraph 4. The method of Paragraph 3, wherein managing the data comprises one or more of storing, updating, creating or removing the data at the UDR.

Paragraph 5. The method of Paragraph 3 or Paragraph 4, further comprising one or more of:
authorizing, by the NEF, the request from the AF; and
transmitting, by the NEF to the AF, a transaction identifier assigned to the request.

Paragraph 6. The method of any one of Paragraphs 3 to 5, wherein the subscribing to the one or more analytics is by the AF.

Paragraph 7. The method of any of Paragraphs 3 to 5, further comprising:
subscribing, by the PCF, to the data at the UDR to be informed about a change in the data, wherein the information on the change in the data is received based on the subscription to the data.

Paragraph 8. The method of Paragraph 1 or Paragraph 2, wherein the subscribing to the one or more analytics is by the PCF; and
wherein the information related to at least one of the one or more analytics is received, by the PCF, from the NWDAF.

Paragraph 9. The method of any previous Paragraph, further comprising transmitting, by the PCF, the control information to an access and mobility management function, AMF.

Paragraph 10. The method of Paragraph 9, wherein the AMF provides the control information to the UE.

Paragraph 11. The method of any previous Paragraph, wherein configuring the control information comprises initiating or updating control information for the UE.

Paragraph 12. The method of any previous Paragraph, wherein the analytics are network data analytics provided by the NWDAF based on input data collected by the NWDAF from one or more network functions.

Paragraph 13. The method of any previous Paragraph, wherein the NWDAF, the PCF and the UE are included in a wireless communication network.

Paragraph 14. The method of any of Paragraphs 3 to 7, wherein the NWDAF, the AF, the NEF, the UDR, the PCF and the UE are included in a wireless communication network Paragraph 15. The method of Paragraph 13 or Paragraph 14, wherein the wireless communication network is 5G NR.

All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for configuring a route selection policy by a policy control function (PCF) in a wireless communication network, the method comprising:
requesting, to a network data analytics function (NWDAF), at least one analytic for at least one route selection component included in the route selection policy;
receiving, from the NWDAF, first information on the at least one analytic for the at least one route selection component and second information on spatial validity and time validity for the first information on the at least one analytic; and
based on the first information on the at least one analytic and the second information on the spatial validity and the time validity, updating the route selection policy on the at least one route selection component, wherein the route selection policy includes route selection validation criteria associated with the second information on spatial validity and time validity,
wherein the route selection validation criteria include a time window and a location criterion.

2. The method of claim 1,
wherein the first information on the at least one analytic includes information on the at least one analytic associated with one of the at least one route selection component.

3. The method of claim 1, wherein the at least one route selection component includes at least one of:
network slice selection,
data network name (DNN) selection,
non-seamless offload indication,
protocol data unit (PDU) session pair identifier (ID),
PDU session type,
access type preference,
session and service continuity (SSC) mode selection, or
redundancy sequence number (RSN).

4. The method of claim 3, wherein at least one of:
in case that the at least one route selection component includes network slice selection, the at least one analytic includes slice load level, service experience or data dispersion and the data dispersion is related to calculating an average data rate in a network slice,
in case that the at least one route selection component includes DNN selection, the at least one analytic includes service experience, user equipment (UE) communication, redundant transmission experience or data network (DN) performance and the first information on the at least one analytic includes traffic characterization, traffic volume, spatial activity or inactivity,
in case that the at least one route selection component includes a non-seamless offload indication, the at least one analytic includes network performance or user data congestion and the first information on the at least one analytic includes status information of a base station and resource usage of the base station, or
the at least one analytic includes redundant transmission experience, in case that the at least one route selection component includes PDU session pair ID.

5. The method of claim 1,
wherein the at least one analytic associated with the time window includes at least one of service experience, network performance, user data congestion, UE communication, data dispersion, redundant transmission experience, or DN performance, and
wherein the at least one analytic associated with the location criterion includes at least one of service experience, network performance, user data congestion, UE communication, data dispersion, redundant transmission experience, or DN performance.

6. The method of claim 1, further comprising initiating delivery of the route selection policy to a user equipment (UE) in the communication network,
wherein requesting the at least one analytic comprises requesting the at least one analytic via a third network entity performing an application function (AF) in communication with the UE.

7. The method of claim 1, wherein the route selection policy is one of a UE route selection policy (URSP), or a URSP rule for the UE.

8. The method of claim 1, wherein requesting the at least one analytic comprises:
subscribing to the at least one analytic with the NWDAF, and
transmitting a request including an analytics ID for each of the at least one analytic.

9. A policy control function (PCF) entity in a wireless communication system, the PCF entity comprising:
a transmitter,
a receiver, and
at least one processor, coupled to the transmitter and the receiver and configured to:
request, to a network data analytics function (NWDAF), at least one analytic for at least one route selection component included in a route selection policy,
receive, from the NWDAF, first information on the at least one analytic for the at least one route selection component and second information on spatial validity and time validity for the first information on the at least one analytic,
based on the first information on the at least one analytic and the second information on the spatial validity and the time validity, update the route selection policy on the at least one route selection component, wherein the route selection policy includes route selection validation criteria associated with the second information on spatial validity and time validity,
wherein the route selection validation criteria include a time window and a location criterion.

10. The PCF entity of claim 9,
wherein the first information on the at least one analytic includes information on the at least one analytic associated with one of the at least one route selection component.

11. The PCF entity of claim 9, wherein the at least one route selection component includes at least one of:
network slice selection,
data network name (DNN) selection,
non-seamless offload indication,
protocol data unit (PDU) session pair identifier (ID),
PDU session type,
access type preference,
session and service continuity (SSC) mode selection, or
redundancy sequence number (RSN).

12. The PCF entity of claim 11, wherein at least one of:
in case that the at least one route selection component includes network slice selection, the at least one analytic includes slice load level, service experience or data dispersion, and the data dispersion is related to calculating an average data rate in a network slice, in case that the at least one route selection component includes DNN selection, the at least one analytic includes service experience, user equipment (UE) communication, redundant transmission experience or data network (DN) performance, and the first information on the at least one analytics includes traffic characterization, traffic volume, spatial activity or inactivity, in case that the at least one route selection component includes a non-seamless offload indication, the at least one analytic includes network performance or user data congestion and the first information on the at least one analytics includes status information of a base station and resource usage of the base station, or the at least one analytic includes redundant transmission experience, in case that the at least one route selection component includes PDU session pair ID.

13. The PCF entity of claim 9, wherein the at least one analytic associated with the time window includes at least one of service experience, network performance, user data congestion, UE communication, data dispersion, redundant transmission experience, or DN performance, and wherein the at least one analytic associated with the location criterion includes at least one of service experience, network performance, user data congestion, UE communication, data dispersion, redundant transmission experience, or DN performance.

14. The PCF entity of claim 9, wherein the at least one processor is further configured to:

initiate delivery of the route selection policy to a user equipment (UE) in a communication network, and request the at least one analytic via a third network entity performing an application function (AF) in communication with the UE.

15. The PCF entity of claim 9, wherein the route selection policy is one of a UE route selection policy (URSP), or a URSP rule for the UE.

16. The PCF entity of claim 9, wherein at least one processor is further configured to:

subscribe to the at least one analytic with the NWDAF, and transmit a request including an analytics ID for each of the at least one analytic.

* * * * *